United States Patent [19]

Akao

[11] Patent Number: 4,576,865
[45] Date of Patent: Mar. 18, 1986

[54] MATERIALS FOR PACKAGING LIGHT-SENSITIVE MATERIALS

[75] Inventor: Mutsuo Akao, Minami-ashigara, Japan

[73] Assignee: Fuji Photo Film Co., Ltd., Minami-ashigara, Japan

[21] Appl. No.: 541,349

[22] Filed: Oct. 12, 1983

[30] Foreign Application Priority Data

Oct. 13, 1982 [JP] Japan .................. 57-178289

[51] Int. Cl.$^4$ ............................. B32B 27/00
[52] U.S. Cl. ................... 428/335; 428/514; 428/516; 428/522; 428/520; 428/349; 156/244.11
[58] Field of Search .............. 428/511, 514, 515, 516, 428/520, 522, 458, 461, 215, 335, 461, 463; 156/244.11

[56] References Cited

U.S. PATENT DOCUMENTS

| | | | |
|---|---|---|---|
| 4,147,291 | 4/1979 | Akao et al. | 426/127 |
| 4,269,937 | 5/1981 | Asanuma et al. | 428/515 |
| 4,337,285 | 6/1982 | Akao et al. | 428/461 |
| 4,363,841 | 12/1982 | Snow | 428/461 |
| 4,452,846 | 6/1984 | Akao | 428/515 |

FOREIGN PATENT DOCUMENTS 2026942  2/1980  United Kingdom .......... 428/516

*Primary Examiner*—Edith Buffalow
*Attorney, Agent, or Firm*—Burns, Doane, Swecker & Mathis

[57] ABSTRACT

A material for packaging light-sensitive materials including a composite sheet (laminate) of a substrate and a thermoplastic resin layer, a layer of said sheet including light-shielding materials, wherein said thermoplastic resin layer includes a surface layer and an intermediate layer which are melt-coextruded, said surface layer being comprised of thermoplastic resin of polyolefins or ethylene copolymer containing substantially no less than 95 mol % of ethylene, said intermediate layer being comprised of one or more copolymers selected from:
(a) a copolymer including 7–30 mol % of acrylic ester and/or methacrylic ester with the balance being ethylene provided that the ester is comprised of an alkyl group having 1–8 carbon atoms, and
(b) a copolymer (EVA) including 7–20 mol % of vinyl acetate with the balance being ethylene.

22 Claims, 8 Drawing Figures

MATERIALS FOR PACKAGING LIGHT-SENSITIVE MATERIALS

BACKGROUND

The present invention relates to a material for packaging light-sensitive materials which deteriorate on exposure to light, in particular, to a material for packaging light-sensitive materials for photographic use such as silver halide photosensitive materials for monochrome and multi-color photographic films, printing films and X-ray films, diazo photosensitive materials, or the like. Materials for packaging light-sensitive materials should possess good light-shielding properties, physical strengths (breaking strength, tear strength, resistance to impact perforation, moistureproofness, heat seal properties (heat seal strength, heat seal properties at low temperatures and hot seal strength), and antistatic properties.

It is difficult for a single film material to possess all these properties. Accordingly composite laminate films comprising a low density polyethylene film in which carbon black or pigment powder is incorporated and a flexible sheet such as paper, aluminum foil, and cellophane have been used as a material for packaging light-sensitive materials.

As the light-shielding paper for such packaging materials, for example as a backing sheet for photographic roll film, a composite sheet comprising a flexible substrate (a so-called "flexible sheet") such as paper coated with a thermoplastic resin layer has widely been used.

A wide variety of resins have been used for the thermoplastic resin layer, all having both merits and demerits.

For instance, low density polyethylene (hereinafter referred to as "LDPE") when used for thermoplastic resin layer has the following demerits: various kinds of defects due to its insufficient flexibility tend to develop; heat seal temperature is high; no heat-sealability with a polystyrene spool for photographic film is obtained; when LDPE is heat-sealed with LDPE, heat-seal defects due to dusts, powders etc. (i.e. when powdery adhering contaminants are present, heat-sealability is decreased) often occur; addition of a light-shielding material decreases strength of film and sealing strength.

Ethylene-vinyl acetate copolymer (hereinafter referred to as "EVA") has drawbacks in which its moisture absorbability is too high; separation from a cooling roller cannot be readily achieved, thereby resulting in low speed of the extrusion, and application of the melt extrusion on a support or substrate is impossible since separation from the cooling roller having a smooth surface is difficult.

Accordingly, even if EVA might be used with a cooling roller having a surface roughed with protrusions and recesses to provide good separation, blocking of EVA readily takes place and slip properties become worse resulting in poor adaptability to the extruding machine, when the cooling roller having EVA wound thereon is left as it is for several days. Thus prevention of blocking and improvement in slip properties should be carried out by applying powder of cornstarch onto an extruded film. However the powder will give rise to dots and nonuniform colors in the photographic materials. Furthermore, EVA has various defects such as high neck-in and poor cutting readiness or the like. Accordingly products which have been melt-extruded and coated with merely EVA have not been used as a material for packaging light-sensitive materials. In particular, EVA including not less than 10 mol % of vinyl acetate (VA) which is heat-sealable with polystyrene has been difficult to practically use since it to a great extent suffers from above-mentioned defects.

Melt-extrusion coating of acrylic ester type copolymer such as ethylene-ethylacrylate copolymer (hereinafter referred to as "EEA") as is disclosed in U.S. Pat. No. 3,832,218 issued on Aug. 27, 1974 cannot overcome the defects similar to those of the EVA coating although the acrylic ester-coated product exhibits excellent flexibility, heat seal properties at low temperatures and heat seal properties in the presence of adhering contaminants. Besides, light-shielding materials such as carbon black will not be uniformly dispersed since finely divided gel particles are difficult to be removed. Accordingly it has been necessary to make a single layer thick to provide a sufficient light-shielding ability by the single layer. Still more, acrylic ester copolymer also readily involves blocking similar to EVA. Accordingly, the melt extrusion coated product with acrylic ester copolymer has not hitherto been put into practical use as a packaging material for light-sensitive materials.

Conventional approaches to lamination of a single layer of the thermoplastic resin onto a substrate have many problems as described hereinabove. Therefore, light-shielding paper which is one of materials for packaging light-sensitive materials has hitherto been produced by applying on a substrate a solution of EVA dissolved with a solvent such as toluene, to the solution being added no less than 20% of additives such as carbon, etc. This process is referred to as solution coating process which results in a high manufacturing cost.

SUMMARY OF THE DISCLOSURE

Accordingly it is a general object of the present invention to provide a material for packaging light-sensitive materials which can eliminate the aforementioned drawbacks.

It is a further object of the present invention to provide a material for packaging light-sensitive materials which possesses slip properties and a laminating speed comparable to those of polyolefin and excellent heat seal properties at low temperature as well as in the presence of adhering contaminants, and good cutting readiness.

The purpose of the present invention is accomplished by:

a material for packaging light-sensitive materials including a composite sheet which is a laminate of a substrate and at least one thermoplastic resin layer, at least one layer of said sheet having light-shielding properties, wherein said thermoplastic resin layer includes a surface layer and an intermediate layer which are melt-coextruded, said surface layer being made of thermoplastic resin of polyolefins or ethylene copolymer containing substantially no less than 95 mol % ethylene, said intermediate layer being comprised of one or more copolymers selected from:

(a) a copolymer including 7–30 mol % of acrylic ester and/or methacrylic ester with the balance being ethylene provided that the ester is comprised of alkyl group having 1–8 carbon atoms, and (b) a copolymer (EVA) including 7–20 mol % of vinyl acetate with the balance being ethylene.

The present invention realizes an excellent material for packaging light-sensitive materials by laminating to layers, each being composed of a thermoplastic resin different from that of the other layer so that excellent properties of each resin are utilized while the disadvantages of each resin are overcome, although both resins have not been put to practical use as a single film due to respective drawbacks.

DETAILED DESCRIPTION OF THE PREFERRED EMBODIMENTS

Figure 1:
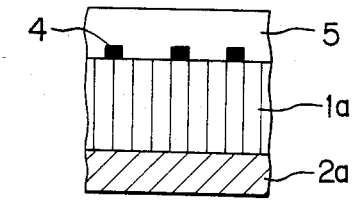

Namely, the surface layer is made of polyolefin thermoplastic resin which is excellent in anti-blocking, slip characteristics and adaptability to lamination. The intermediate layer is made of EVA which exhibits poor separation from a cooling roller, disadvantageous neck-in and cutting readiness, or acrylic ester resin (EEA etc), methacrylic ester resin which exhibit excellent tear strength, heat seal properties at low temperatures and heat seal properties in the presence of adhering contaminants, but disadvantageous neck-in and poor cutting readiness. The two layers are melt-coextruded and coated upon the substrate to melt the requirements for the material for packaging light-sensitive materials: such as neck-in and laminating speed which are important for its production, and heat seal properties necessary in making bags or sealing, as well as light-shielding properties, seal properties at low temperatures, seal properties in the presence of adhering contaminants, anti-blocking and moistureproofness, etc.

The material for packaging light-sensitive materials of the present invention can be used for photographic light-sensitive materials, medicines, dyes, foods and the like which change or deteriorate their characteristics on exposure to light. Especially it is most suitable for a light-shielding paper for photographic roll film.

In the present invention, it is preferable that the surface layer has a thickness of 0.3–5 microns so that good neck-in, separation from roller, anti-blocking and slip properties are obtained, and an intermediate layer having a good seal properties at low temperatures can be penetrated through the surface layer on heat-sealing to accomplish sealing. The intermediate layer should have a thickness not less than 4 microns and the coextruded layer should have a total thickness not less than 9 microns to provide a stable coating layer. The surface and intermediate layers are melt-coextruded and laminated upon a substrate (the term "substrate" herein encompasses also such a substrate including a light-shielding layer). A layer which enhances a bonding power between the substrate and the coextruded layer may be optionally disposed therebetween.

The light-shielding layer is formed as at least one layer of the composite sheet which may be a single layer (for example made of a metal foil such as aluminum foil) or a composite layer containing dispersed light-shielding material, or a combination of two or more light-shielding layers.

The surface layer may be made of various polyolefin resins which have excellent melt-extrusion properties and are economical, or ethylene copolymer thermoplastic resin containing substantially not less than 95 mol % of ethylene.

The intermediate layer is made of a thermoplastic resin which melts at a temperature lower than that at which the material of the surface layer and substrate melt, such resins being, e.g., EVA, EEA etc.

The light-shielding paper for photographic roll film generally includes a substrate having a print layer thereon coated by a protective layer.

The present invention will be described in more detail.

The material for packaging light-sensitive materials of the present invention comprises at least three layers. A substrate of them may be of a material which has been used for conventional packaging materials. For example paper; unwoven fabric; cellophane; synthetic paper; metal foil such as aluminum foil; thermoplastic resin film having a heat resistance higher than those of the intermediate and surface layers; cloth; cross laminated airly fabric, flat yarn etc.

The thermoplastic resin film used for the substrate includes a film made of high density polyethylene, polypropylene, polyester, polyamide, preferably stretched or crystal-oriented film.

A cross-laminated film including stretched films of high density polyethylene having crossing stretch axes which are bonded each other by a bonding layer is more preferable.

Since the substrate employed in the present invention should be endurable until the intermediate layer is sealed by melting of the surface layer, the substrate is preferably made of paper, cellophane, unwoven fabric, aluminum foil, flat yarn and the like.

The substrate is not limited to a single layer, and may be made of a laminate of a plurality of layers of different materials. The substrate may be made of other materials such as paperboard, triacetate film, PVA film, K-liner, metal-deposited film, paper and the like.

A suitable combination of the aforementioned materials is selected depending upon the properties necessary for the substrate, i.e., light-shielding properties, moistureproofness, physical strength, cutting readiness, cost, thickness etc. In general, paper, thermoplastic resin and film etc. are used.

Lamination of the layers to each other can be made by melt extrusion coating, as well as application of solvent or solution type adhesives or by hot melt bonding process or other known process. The substrate may be provided with a printed layer thereon followed by a protective layer. The substrate may be coated with an aluminum deposited layer or aluminum foil by means of an adhesive layer, if desired. The substrate may be subjected to corona discharge treatment, flame treatment etc. or be coated with an anchor coat or adhesive layer for enhancing bonding power between the substrate and the intermediate layer or between aluminum foil or aluminum deposited layer and the intermediate layer.

The intermediate layer is made of thermoplastic, a resin which melts at a temperature lower than those of the substrate and surface layer, specifically one or more selected from EVA, ethylene-acrylc ester copolymer (EEA etc.) and ethylene-methacryllic ester copolymer. Alternatively, a blend of the aforementioned copolymer resin and various polyolefins may be used, EVA containing 7–20 mol %, preferably 10–20 mol % of vinyl acetate is used. EVA containing less than 7 mol % of vinyl acetate (VA) loses its advantages, and EVA containing 20 mol % or more VA has difficulties in photographic performances, lamination adaptability, odor, cutting readiness, respectively. Increase in the VA amount deteriorates neck-in, cutting readiness, separation readiness from cooling roller, blocking, and slip characteristics and enhances moisture absorption while it improves heat seal properties with polystyrene spool core for photographic film. Accordingly the mol ratio of ester in such a range is preferable. Ethylene-acrylic ester copolymer and ethylene-methacrylic ester copolymer each including 7-30 mol %, preferably 10-20 mol % ester are used. The copolymer including ester of less than 7 mol % and 31 mol % or more loses its advantages and has difficulties in photographic performances, lamination adaptability, cutting readiness, odor and the like. The ester comprised of alkyl group having not more than 8 carbon atoms may be used, e.g.,: methyl acrylate, ethyl acrylate, butyl acrylate, 2-ethyl-butyl acrylate, ethyl methacrylate, butyl methacrylate and the like. Alternatively, mixed resin of aforementioned ethylene copolymer, various polyolefins and various additives may be used. Mixed resin with EVA may include substantially 7-20 mol %, preferably 10-20 mol %, of VA. Mixed resin with ethylene-acrylic ester copolymer, ethylene-methacrylic ester copolymer may include substantially 7-30 mol %, more preferably 10-20 mol %, of ester. Besides light-shielding materials, various known additives such as antistatic agent, lubricant, filler, slip agent, anti-oxidizing agent may be added to the aforementioned thermoplastic resin forming the intermediate layer.

The surface layer is made of various polyolefin resins or ethylene copolymer thermoplastic resin containing not less than 95 mol % ethylene. Copolymer including less than 95 mol % of ethylene are poor in anti-blocking properties, moistureproofness, cutting readiness, slip characteristics and lamination adaptability, so that it is difficult to put into practical use.

Material for the surface layer encompasses various copolymers containing not less than 95 mol % of ethylene (such as EVA, ethylene-acrylic ester copolymer and ethylene-methacrylic ester copolymer); low, moderate and high density polyethylene; modified polyethylene; linear low density polyethylene (L-LDPE) of various types; polypropylene of various kinds or the like. Use can be made of either above polyolefins alone, or a blend of two or more of above polyolefins. A blend of the thermoplastic resins of the polyolefins hereinabove mentioned and copolymers containing less than 95 mol % of ethylene may be used as long as the blend contains not less than 95 mol % of ethylene. For example, a blend of 50 parts of ethylene-acrylic ethyl copolymer containing 92 mol % of ethylene and 50 parts of low density polyethylene may be used, which blend is considered to include 96 mol % ethylene.

A blend containing the same type of resin as that of the intermediate layer is effective especially to improve the bonding power between the surface and intermediate layers. The thermoplastic resin of the surface layer may be added with additives such as known antistatic agents, lubricants, fillers, slip agents, anti-oxidizing agents as well as light-shielding materials.

Thermoplastic resin which is a copolymer of ethylene and other monomer may be advantageously employed depending upon the uses. For example, linear low density polyethylene (L-LDPE) which is prepared by copolymerizing ethylene with 0.5-10 mol % of α-olefin having 3-13 carbon atoms by low pressure process possesses excellent strength. Furthermore, as material for the surface layer the same type of thermoplastic resin as used for the intermediate layer may be used so long as it contains 95 mol % or more of ethylene. However it is preferred to use low-density polyethylene (LDPE), moderate-density polyethylene (MDPE), high-density polyethylene (HDPE), linear low-density polyethylene (L-LDPE), or polypropylene (PP).

It is necessary for at least one layer of the composite sheet to possess light-shielding properties since the packaging material of the present invention is used for packaging the light-sensitive materials. The light-shielding properties may be provided by incorporating the light-shielding material by mixing and dispersing the light-shielding material in the substrate or the melt-coextruded resin layer. Alternatively the light-shielding material may be applied on a layer (generally the surface of the substrate) by printing, impregnation coating, metal deposition, lamination of a metal foil etc. The term "light-shielding material" used herein includes a material through which visible and ultraviolet rays cannot transmit and which is in the form of a film (vacuum deposited film of metal such as aluminum deposited film, metal foil such as aluminum foil, tin foil), or a material dispersed in the layer. Specifically the light-shielding material includes inorganic or organic pigment such as carbon black; iron oxide; zinc oxide; titanium oxide; mica; aluminum powder; aluminum paste/resin dispersed material; calcium carbonate; barium sulfate; pigments such as cadmium pigments, chrome yellow, iron red, cobalt blue, copper phthalocyanine pigments, monoazo or polyazo pigments, etc.; and a mixture thereof. Generally carbon black of various kinds, aluminum paste/resin dispersed material, mica, calcium carbonate, titanium oxide are used. Various types of carbon black, particularly furnace type carbon black, are most commonly used. The dispersed light-shielding material is included in the substrate or the thermoplastic resin in an amount of 1-20% by weight, preferably 1-10% by weight. The light-shielding material may be contained in any of the substrate or, adhesive, intermediate or surface layers.

Vacuum deposited film of metal (vacuum deposited film of aluminum is most commonly used) and metal foil (aluminum foil is most commonly used) are not only used as the light-shielding layer, but also as antistatic, moistureproof, waterproof and gas barrier material due to its excellent properties. The thus constructed packaging material is not only advantageous in its manufacture, but also valuable as a material for packaging light-sensitive materials serving various purposes. The term "light-sensitive material" used herein includes any material which will deteriorate on exposure to light, as well as photographic material. Namely, the following things are included: foodstuff such as chocolate, margarine, miso (fermented products of soy beans), beer, wine etc.; dyes and medicines which change colours and which modify on exposure to light as well as various photosensitive materials such as monochrome-, color-, X-ray-, and printing silver halide photosensitive materials and diazo photosensitive materials.

The packaging material of the present invention may be used in any fields aforementioned, and especially valuable as a light-shielding paper for the photographic roll film. The light-shielding paper used in the form of the backing of the photographic roll film is superposed on the photographic film having a predetermined length. The photographic film thus superposed with the light-shielding paper is wound on a spool or woundly brought into a case having a given volume. Accordingly the thickness of the paper is limited to a given amount, i.e., generally 50-150 microns, preferably 90-120 microns, since the length of the light-shielding paper is predetermined. The present invention can with ease provide a packaging material having a thickness which falls in such a range.

With respect to the light-shielding paper for photographic roll films, the drawbacks which have not been overcome by prior art are as follows:

(1) adhesion of the light-shielding paper onto film in high temperature and high moisture conditions due to lack of moistureproofness;

(2) fogging due to gas penetration;

(3) size instability due to moisture absorption;

(4) poor cutting readiness;

(5) blocking of light-shielding papers to each other due to too a soft surface thereof; or the like.

Besides the light-shielding properties, the surface and intermediate layers of the present invention have excellent flexibility, moistureproofness, gas barrier properties, size stability, anti-blocking properties as well, although they form a thin layer. It is preferable to provide the substrate with an aluminum layer in addition to a paper layer to enhance the moistureproof effect. In this connection, 3–30 microns aluminum foil, 0.01–0.2 microns vacuum deposited Al-layer and 5–100 microns aluminum-dispersed layer are effective.

It has heretofore been difficult to make thin products from polyolefin by melt-extrusion coating of a sole layer thereof. However, by coextrusion in accordance with the present invention it is easy to make a polyolefin surface layer of 0.3–5 microns. The coextrusion of the intermediate layer material such as EVA, EEA which had heretofore to be done by solvent coating with respect to roll separation properties is also made possible. These are the advantages of the present invention. It is preferable that the surface layer of the packaging material for the photographic roll film has a thickness of 0.3–5 microns, more preferably 1–3 microns, (particularly, 0.3–2 microns for the light-shielding paper of the photographic roll film). If the surface layer is thinner, the intermediate layer may be exposed due to interruption and disruption of the coated layer, resulting in little effect of the surface layer with respect to separation readiness from the cooling roller, blocking, and occurence of streaks on coating. If the surface layer is thicker it will not be broken on heat-sealing so that the intermediate layer will not be heat-sealed. Accordingly there are difficulties with sealing properties at low temperatures and in the presence of adhering contaminants, and necessary heat-sealing properties with the polystyrene spool of the photographic film are lacking.

The intermediate layer should be not less than 4 microns since the coating layer, coextruded with the surface layer, having a total thickness not higher than 9 microns will not be stable and since the maximum thickness of the surface layer is 5 microns. The thickness of the intermediate layer is conveniently selected within a range between 4 to 70 microns according to the purposes. It is preferable that the thickness of the melt-coextruded layer including surface and intermediate layers (optionally including other layer such as an adhesive layer) be not less than 9 microns, whereas it is difficult to provide a stable coating layer with a thinner thickness.

Specifically the light-shielding paper for the photographic roll film includes a 0.3–5 microns (preferably 0.3–2 microns) surface layer and a 4–70 microns intermediate layer (preferably 7–30 microns), the total thickness being 9–75 microns (preferably 13–32 microns). However, the thickness of the layers may be changed for other applications.

Figure 2:
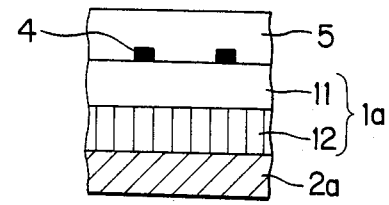

Other objects and aspects of the invention will become apparent from the following description of embodiments with reference to the accompanying drawings which are presented for illustrative purpose and not for limitative purpose:

FIGS. 1 and 2 are sectional views showing conventional packaging materials disclosed in U.S. Pat. No. 3,832,218, and FIGS. 3 to 8 are sectional views showing packaging materials of the present invention.

In the Figures, numerals with suffix "a" indicate the light-shielding layer.

Referring now to FIG. 1, a packaging material comprises a substrate 1a having light-shielding properties, an intermediate light-shielding layer 2a of EEA, or EVA coated on one side of the substrate 1a, a printing layer 4 on the other side of the substrate 1a, coated with a protective layer 5.

Referring to FIG. 2, a packaging material including a substrate 1a which is made by vat line lamination or coextrusion of a uncolored substrate 11 and a colored substrate 12. The other layers are made in the same manner as packaging material shown in FIG. 1.

Figure 3:
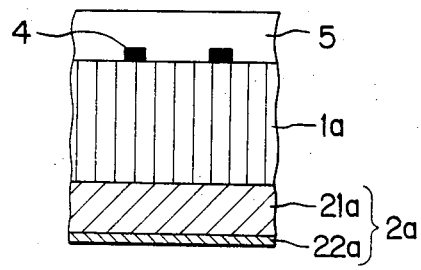

Referring to FIG. 3, a melt-coextruded light-shielding layer 2a including an intermediate and surface light-shielding layers 21a and 22a is coated on a substrate 1a having light-shielding properties in lieu of the layer 2a shown in FIG. 1.

Figure 4:
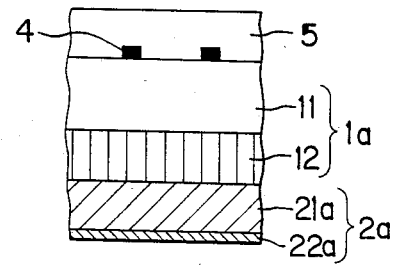

Referring to FIG. 4, a hot melt-coextruded light-shielding layer 2a including an intermediate and surface light-shielding layers 21a and 22a, same as those shown in FIG. 3, is coated in lieu of the light-shielding layer 2a of FIG. 2.

Figure 5:
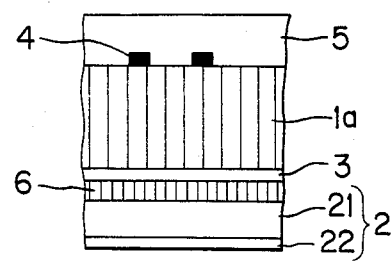

Referring to FIG. 5, a flexible sheet 6 such as aluminum foil etc is applied on a substrate 1a having light-shielding properties with an adhesive layer 3. A hot melt coextruded layer 2 including an intermediate and surface layers 21 and 22 is then coated on the flexible sheet 6. A protective layer 5 is formed on the other side of the substrate 1a after it has been applied with a printing layer 4.

Figure 6:
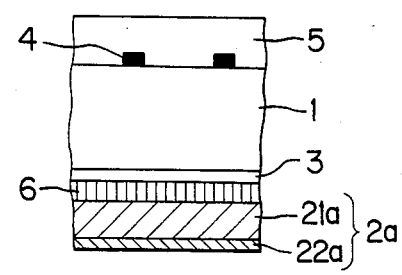

Referring to FIG. 6, a substrate having no light shielding properties is provided in lieu of the substrate 1a having light-shielding properties shown in FIG. 5; an intermediate layer 21a having light-shielding properties is provided in lieu of the intermediate layer 21 having no light shielding properties as shown in FIG. 5; and a surface layer 22a having light shielding properties is provided in lieu of the surface layer 22 having no light shielding properties as shown in FIG. 5. Except for these, the structure is identical with that of FIG. 5.

Figure 7:
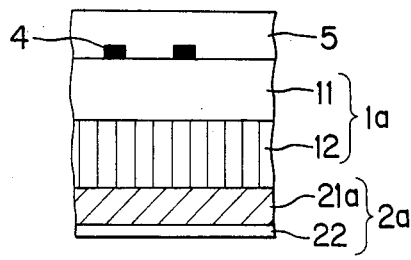

Referring to FIG. 7, a hot melt-coextruded layer 2a including an intermediate layer 21a having light-shielding properties and a surface layer 22 having no light-shielding properties is formed in lieu of the single hot melt-extruded light-shielding layer 2a.

Figure 8:
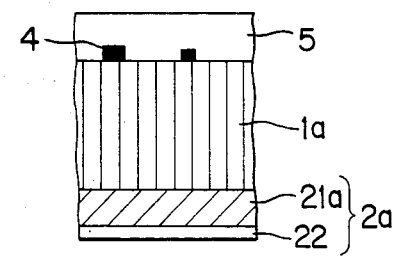

Referring to FIG. 8, the structure is identical with that of FIG. 7 except for the substrate.

Although typical preferred embodiments of packaging materials for light-sensitive materials of the present invention have been disclosed, the present invention is not limited to these embodiments and any combinations with the other known materials are possible.

The substrate (1, 1a or may include a flexible sheet 6) may be made of the aforementioned materials.

The adhesive layer 3 may be made of extrusion laminate type adhesive of thermoplastic resins such as various kinds of polyethylene, ethylene-ethylacrylate copolymer, ethylene-vinyl acetate copolymer, linear low-density polyethylene (L-LDPE), polypropylene, ionomer etc; known water soluble adhesives; pressure sensitive adhesives; solvent type adhesives; hot melt adhesives; dry laminate adhesives or the like.

Now the present invention will be described by reference to the examples which serve to illustrate the present invention.

EXAMPLE 1

A light-shielding paper (of the present invention) having the layer structure of FIG. 3 was tested to compare with a conventional article of FIG. 1. The substrate 1a having light-shielding properties was made of bleached kraft paper having a thickness of 65 microns and a basis weight of 60 g/m² and containing 8 wt % of carbon black in the fiber structure. As the conventional article shown in FIG. 1, ethylene-ethyl acrylate copolymer containing 5 wt % of carbon black (DPD-6169 manufactured by Union Carbide, U.S.A., containing 16 mol % of ethyl acrylate, specific weight: 0.931, M.I.: 6) was coated on the substrate by hot melt-extrusion using an extrusion machine to form a light-shielding layer having a thickness of 20 microns.

On the other hand, a packaging material of the present invention was prepared by hot melt-extrusion of the light-shielding layer 2 including a 19.5 microns thick intermediate light-shielding layer 21 of ethylene-ethyl acrylate copolymer (DPD6169) containing 5 wt % of carbon black same as that of FIG. 1 and a surface light-shielding layer 22a of low-density polyethylene having a density of 0.923 and a thickness of 0.5 microns and containing 5 wt % of carbon black. The total thickness of the light-shielding layer 2a was 20 microns. Cooling rollers having a flat (glossy) surface was used.

Both conventional and inventive products were formed with protection layers 5 after having been applied with print 4 on the other side thereof.

The results of the test are shown in Table 1. It can be seen from the Table 1 that the inventive product was superior to the conventional article with respect to neck-in, cutting readiness, laminating speed, blocking, slip characteristics, cost, and was equal to the conventional article with other characteristics.

EXAMPLE 2

A conventional article of FIG. 2 and an article of the present invention of FIG. 4 were prepared and tested in the same manner as in Example 1. The substrate 1a having light-shielding properties was made of bleached kraft paper 1a having a thickness of 65 microns and a basis weight of 60 g/m² which was prepared by lamination papermaking of a paper 11 containing no carbon black in the fiber structure and a paper 12 containing 10 wt % of carbon black. A light-shielding layer having a thickness of 20 microns which was same as that of Example 1 was coated on the bleached kraft paper. An intermediate layer 21a of 19 microns and a surface light-shielding layer 22a of 1 micron were hot melt-coextruded to form a light-shielding layer 2a having a total thickness of 20 microns.

The test results obtained are shown in Table 1. The article of the present invention was superior to conventional article with respect to neck-in, cutting readiness, laminating speed, anti-blocking, slip characteristics and was substantially equal to the latter with other respects.

EXAMPLE 3

A packaging material which was structually identical with that of Example 1 except that as the surface light-shielding layer 22a high density polyethylene manufactured by Mitsui Petrochemical Co., Ltd. having a density of 0.960 g/cm³ was employed and cooling rollers having mat surface were used on preparation. The prepared material was tested in the same manner as in Example 1.

The test results obtained are shown in Table 1. The article of the present invention was superior to that of Example 1 using low-density polyethylene for the surface layer with respect to antistatic properties, cutting readiness, anti-blocking, slip characteristics and was substantially equal to the latter with other respects.

EXAMPLE 4

A light-shielding paper (article of the present invention) having the same layer structure as FIG. 3 was compared with that of Example 1. Each substrate 1a was made of bleached kraft paper having a basis weight of 60 g/m² and containing 8 wt % of carbon black in the fiber structure which is same as Example 1. A light-shielding layer of ethylene-vinyl acetate (10 mol %) copolymer (EVA) containing 4.5 wt % of carbon black was hot melt-extruded on a bleached kraft paper through an extruding machine so that the coating layer have a total thickness of 20 microns.

On the other hand, an inventive article was prepared by hot melt coextruding an intermediate layer 21a having a thickness of 19 microns made of ethylene (90 mol %)-vinyl acetate copolymer containing 4.5 wt % of carbon black (same as conventional article) and a surface light-shielding layer 22a having a thickness of 1 micron made of linear low-density polyethylene (L-LDPE) (Ultzex 2080 C manufactured by Mitsui Petrochemical Co., Ltd.) containing 5 wt % of carbon black so that the light-shielding layer 2a have a total thickness of 20 microns. Cooling rollers having semi-mat surface were used.

Test results of both articles are shown in Table 1. The inventive article was superior to the conventional article with respect of laminating speed, anti-blocking, slip properties, cost and was substantially equal to the latter with other respects.

EXAMPLE 5

A packaging material (inventive article) having the layer structure of FIG. 6 was prepared as follows:

A flexible sheet 6 of an aluminum foil having a thickness of 7 microns was applied onto a substrate 1 made of kraft paper having a thickness of 77 microns, a basis weight of 70 g/m² by means of 16 microns low-density polyethylene adhesive layer 3. An intermediate light-shielding layer 21a having a thickness of 17 microns made of an ethylene-methyl acrylate (25 mol %) copolymer and a surface layer 22a having a thickness of 3 microns made of high density polyethylene (manufactured by Mitsui Petrochemical Co., Ltd.) having a density of 0.96 g/cm³ and containing 3 wt % of carbon black were hot melt coextruded to form a light-shielding coating layer 2a having a total thickness of 20 microns on the kraft paper. Cooling rollers having mat surfaces were used. The test results are shown in Table 1.

The inventive article was superior to the conventional article with respect to antistatic properties, neck-in, cutting readiness, laminating speed and was substantially equal to the latter with other respects.

It is apparent that the present invention is not limited to aforementioned examples and is applicable in various fields. Specifically the materials of the present invention may be used for not only photosensitive materials, but also pharmaceuticals, dyes, foodstuffs which will deteriorate on exposure to light. Besides as the light-shielding paper for the roll film, the packaging materials of the present invention may alternatively be used in the form of light-shielding bags, lining papers, papers for automatic manufacture of bags, or paper tube. It should be understood that modifications may be done without departing from the concept and scope of the present invention as disclosed and claimed.

TABLE 1

| | Examples | | | | | | | |
|---|---|---|---|---|---|---|---|---|
| | 1 | | 2 | | 3 | 4 | | 5 |
| | FIG. NO. | | | | | | | |
| | 1 | 3 | 2 | 4 | 1 | 1 | 3 | 6 |
| | Conv. | Inv. | Conv. | Inv. | Inv. | Conv. | Inv. | Inv. |
| Surface of cooling roller | Smooth | Smooth | Smooth | Smooth | mat | semimat | semimat | mat |
| Light-shielding properties | B | A | B | A | A | B | A | A |
| Cutting readiness | D | B | D | B | A | X | C | A |
| Laminating speed (m/min) | no less than 10 | no less than 100 | no less than 10 | no less than 100 | no less than 100 | no less than 5 | no less than 100 | no less than 100 |
| Separation from cooling roller | X | B | X | B | A | X | C | A |
| Neck-in (cm) | 34 | 30 | 34 | 30 | 28 | 48 | 41 | 25 |
| Anti-blocking | D | B | D | B | A | X | B | A |
| Slip angle | not slipped no less than 45 | 35 | not slipped no less than 45 | 35 | 27 | not slipped no less than 45 | 36 | 23 |
| Manufacturing cost index | 100 | 50 | 95 | 45 | 50 | 90 | 45 | 63 |

A = Excellent, B = Sufficiently practical, C = Practical, D = Improvements required, X = Unusable,
Cutting readiness: Cutting readiness of a material upon being cut with a cutter, perforating machine, or the like.
Anti-blocking: difficulty of inter-layer adherence when load is applied to sheets.
Conv.: conventional, Inv.: present invention

What is claimed is:

1. A material for packaging light-sensitive materials including a composite sheet which is a laminate of a substrate and at least one thermoplastic resin layer, at least one layer of said sheet having light-shielding properties,
  wherein said thermoplastic resin layer is prepared by the process of melt coextruding a surface layer and an intermediate layer;
  said surface layer being comprised of thermoplastic polyolefin resin selected from the group consisting of low density polyethylene, medium density polyethylene, high density polyethylene, linear low density (L-LDPE), ethylene copolymer other than L-LDPE which contain no less than 95 mol % of ethylene, polypropylene and mixtures thereof,
  said intermediate layer having a thickness of at least 4 microns and being heat sealable and being comprised of one or more copolymers selected from:
    (a) copolymer including 7-30 mol % acrylic ester and/or methacrylic ester with the balance being ethylene provided that the ester is comprised of an alkyl group having 1-8 carbon atoms, and
    (b) an ethylene vinyl acetate copolymer (EVA) including 7-20 mol % of vinyl acetate with the balance being ethylene.

2. A material as defined in claim 1, wherein said surface layer has a thickness of 0.3-5 microns.

3. A material as defined in claim 1, wherein said intermediate layer has a thickness of 4-70 microns.

4. A material as defined in claim 1, wherein said coextruded layer including said surface and intermediate layers has a total thickness of 9-75 microns.

5. A material as defined in claim 1, wherein said intermediate layer is comprised of EVA containing 10-20 mol % of vinyl acetate, a copolymer of ethylene-acrylic ester or a copolymer of ethylene-methacrylic ester provided that said copolymers contain 10-20 mol % of ester.

6. A material as defined in claim 5, wherein said surface layer of polyolefin thermoplastic resin has a thickness of 0.3-2 microns.

7. A material as defined in claim 6, wherein said surface layer is comprised of high density polyethylene having a density of not less than 0.95 g/cm$^3$.

8. A material as defined in claim 5 or 6, wherein the substrate includes paper.

9. A material as defined in claim 1, wherein one or more layers of the composite sheet contain 1-20 wt % of the light-shielding material.

10. A material as defined in claim 9, wherein one or more layers of the composite sheet contain 3-10 wt % of the light-shielding material.

11. A material as defined in claim 9 or 10, wherein the light-shielding material is carbon black.

12. A material as defined in claim 1, wherein said substrate includes a thermoplastic resin film which is stretched or molecular-oriented.

13. A material as defined in claim 12, wherein the substrate includes laminate of two or more uniaxial stretched films with a cross angle of the stretching axes of 45-90 degrees.

14. A material as defined in claim 1, wherein the surface layer is an ethylene copolymer selected from the group consisting of ethylene vinyl acetate copolymer, ethylene-acrylic ester copolymer, ethylene-methacrylic ester copolymer and mixtures thereof.

15. A material as defined in claim 1, wherein the surface layer is comprised of a blend containing 95 mol % or more of ethylene and at least one polymer selected from the group consisting of ethylene vinyl acetate copolymer, ethylene-acrylic ester copolymer and ethylene-methacrylic ester copolymer.

16. A material as defined in claim 1, wherein the intermediate layer is comprised of a blend of said polyolefins and EVA, the blend including 7-20 mol % of vinyl acetate.

17. A material as defined in claim 1, wherein the intermediate layer is comprised of a blend of said polyolefins with ethylene-acrylic ester copolymer and/or ethylene-methacrylic ester copolymer, the blend including 7-30 mol % of ester.

18. A material as defined in claim 1, wherein said ester is of one or more selected from the group consisting of methyl acrylate, ethyl acrylate, butyl acrylate, 2-ethyl-butyl acrylate, ethyl methacrylate and butyl methacrylate.

19. A material as defined in claim 1, wherein said intermediate layer comprises a minor amount of one or more known additives selected from the group consisting of light-shielding materials, antistatic agents, lubricants, fillers, slip agents and antioxidizing agents.

20. A material as defined in claim 2, wherein said surface layer is 1-3 microns thick.

21. A material as defined in claim 3, wherein said intermediate layer is 10-30 microns thick.

22. A material as defined in claim 4, wherein the total thickness of said surface and intermediate layers is 13-32 microns thick.

* * * * *